United States Patent [19]
Fletcher et al.

[11] Patent Number: 5,590,057
[45] Date of Patent: Dec. 31, 1996

[54] TRAINING AND CERTIFICATION SYSTEM AND METHOD

[75] Inventors: Robert L. Fletcher, Dallas; Gregory V. Ruuska, Garland, both of Tex.

[73] Assignee: Atlantic Richfield Company, Los Angeles, Calif.

[21] Appl. No.: 169,264

[22] Filed: Dec. 20, 1993

[51] Int. Cl.$^6$ .......................... G06F 15/20; G06F 15/42; G07B 7/00
[52] U.S. Cl. ...................... 364/551.01; 364/578; 434/336
[58] Field of Search ...................................... 434/118, 219, 434/258, 322, 323, 327, 336; 364/551.01, 419.2, 578, 580

[56] References Cited

U.S. PATENT DOCUMENTS

| | | | |
|---|---|---|---|
| 5,059,127 | 10/1991 | Lewis et al. | 434/353 |
| 5,103,408 | 4/1992 | Greenberg et al. | 364/550 |
| 5,259,766 | 11/1993 | Sack et al. | 434/362 OR |
| 5,326,270 | 7/1994 | Ostby et al. | 434/118 OR |

OTHER PUBLICATIONS

Eliot C. et al; "An adaptive student centered curriculum for an intelligent training system"; User modeling and User–Adapted Interaction; vol. 5, No. 1, pp. 67–86. 1995.

Foley, W. A validation Study of a Curriculum Simulation planning model for Education; Office of Education, Washington D.C. Nov 1972.
Thomas, T. item–presentation controls for multidimentsional item pools in computerized adaptie testing; Psychonomic Socity, Inc. Behavior Research Methods, Instruments, & Computers; 22(2), 247–252 1990.

*Primary Examiner*—James P. Trammell
*Assistant Examiner*—K. Shan
*Attorney, Agent, or Firm*—Joseph D. Yao

[57] ABSTRACT

The present invention relates to a system and method for training and certifying a user to perform a task. The system includes an input device, output device and a controller. The controller receives input data from the input device and controls the output displayed on the output device. A supervisor interprets the input data, determines the control data to be sent to the output device and determines log data to be sent to a data storage. A comparator determines if certain log data meets or exceeds a preset limit data to determine certifiability of a user. The system presents a user with a pretest, a module containing instructions, information about a certain portion of the task to be performed, as well as mini-simulations and a variety of questions. A full simulation is presented to the user to apply everything that was learned by the user during that certain module. The system then presents a post-test and, through the comparator, determines if the user is certifiable.

4 Claims, 7 Drawing Sheets

TRAINING AND CERTIFICATION SYSTEM AND METHOD

BACKGROUND OF THE INVENTION

1. Field of the Invention

This invention relates generally to the field of training systems, and more particularly, to an interactive simulation training and certification system and a method for performing the same.

2. Background

Many corporations have a number of plant facilities, satellite offices and remote sites that are required to have their employees receive government-mandated safety training. Governmental agencies monitor and certify that the employees can conduct the required tests and procedures. At certain remote sites, governmental inspectors may arrive uninvited to review employees' ability to comply with safety procedures.

More specifically, in some facilities and sites related to oil and gas production and processing, there are very rigid, stringent safety rules and procedures set down by governmental agencies. For example, on offshore rigs, it is required that employees be able to check the platform's safety systems for integrity and operability.

Periodically, government inspectors visit the offshore rig and have the right to choose any employee to test the integrity of the safety system and exhibit their personal knowledge of the safety procedures. Previously, only a small, select group of employees had a working knowledge of the tests required for the safety system. With the broadening of governmental regulations, now it is desirous to have all employees trained to be able to test the safety system.

To ensure that the facility or site is not closed by governmental inspectors for employees' failure to follow government safety procedures, corporations have prepared a variety of training presentation systems. One common training system is a live presentation by a safety representative to a group of employees. This system allows the safety representative to be available to answer questions and tailor the presentation to the employees to be trained.

Another training system is a linear video program (i.e, film or slide show) which has a program structure, pace, selection of material and sequences laid out the same way for every employee. A linear video program for training employees in safety procedures would present safety rules, safety equipment in its location in the facility, and depict an employee properly using the equipment in accordance with the safety rules while explaining the dos and don'ts of such procedure. The drawback of the video program is that some parts of the program may not be applicable to a certain group of employees and that there is no provision to allow for questions from the employees.

The two above-mentioned training systems, linear video program and live presentation, require that the employee have only a passive role in watching what procedures are to be taken. This results in minimal retention by employees at either presentation. Also, if the employees are to be certified to work with certain safety systems, a separate test is required for each employee.

An employee's failure to pass the test, although it may be just one section of the test, would require the employee to sit through the entire presentation again. In other situations, an employee's time can be wasted in training and certifying his ability in areas in which he has expertise, because others in his class lack his expertise.

These two training systems view all employees as being equal and not having any particular expertise. Also, these two training systems do not allow the program to be tailored to an employee who might need more attention in a certain area. Therefore, group presentations, whether they be linear video programs or live presentations, become time-consuming and fail to address the individual needs of the employees. Also, in the certification phase, the employees who fail a part of the test are forced to review the entire program.

SUMMARY OF THE INVENTION

In accordance with the present invention, a training and certification system is provided which substantially eliminates or reduces disadvantages and problems associated with prior presentation systems.

In one aspect of the present invention, a system for training and certifying a user to perform a task, comprises a controller, a supervisor of the controller, and a comparator. The controller receives input data from an input device, sends control data to an output device and sends log data of a user to a data storage. The supervisor of the controller interprets the input data, determines the control data to be sent by the controller to the output device and determines the log data to be sent to the data storage. The comparator, having access to the data storage, compares the log data with preset limit data to determine certifiability of the user.

In accordance with another aspect of the present invention, there is provided a method for training and certifying a user by pre-testing the user, instructing the user as to necessary information to perform the task, providing a simulation for the user to interact with, monitoring the user's interaction with a simulation, and testing the user's knowledge of the instructed information provided. This series of steps is repeated until all of the information has been provided to the user, at which time the user is tested as to the entire information and his score is compared to acceptable standards to determine certifiability of the user.

In another aspect of the present invention, there is provided a method for training and certifying a user to perform a task by receiving knowledge of the user through input data, storing certain portions of the input data as log data (such as user identification and test scores), providing a simulation of the task to the user by sending control data to an output device, monitoring user interaction with the simulation to determine if the user requires further review, and testing user's knowledge of the presented information before allowing user to proceed to the next section of information. The steps are repeated until the user has been provided all of the necessary information to perform the task. The user is then tested for knowledge of the entire necessary information for the task, and his resultant score is then compared to an acceptable standard to determine certifiability of the user.

An important technical advantage of the present invention includes the ability to individually train a user. In addition, the user's scores may be logged and compared to preset limits to determine certifiability of the user in performing the task.

Another important technical advantage of the present invention includes an efficient and effective system and method for training and certifying users through a simplified and economical design, manufacture and assembly.

BRIEF DESCRIPTION OF THE DRAWING

The invention will be apparent from the following description, appended claims and accompanying drawings in which:

DETAILED DESCRIPTION OF THE INVENTION

Figure 1:
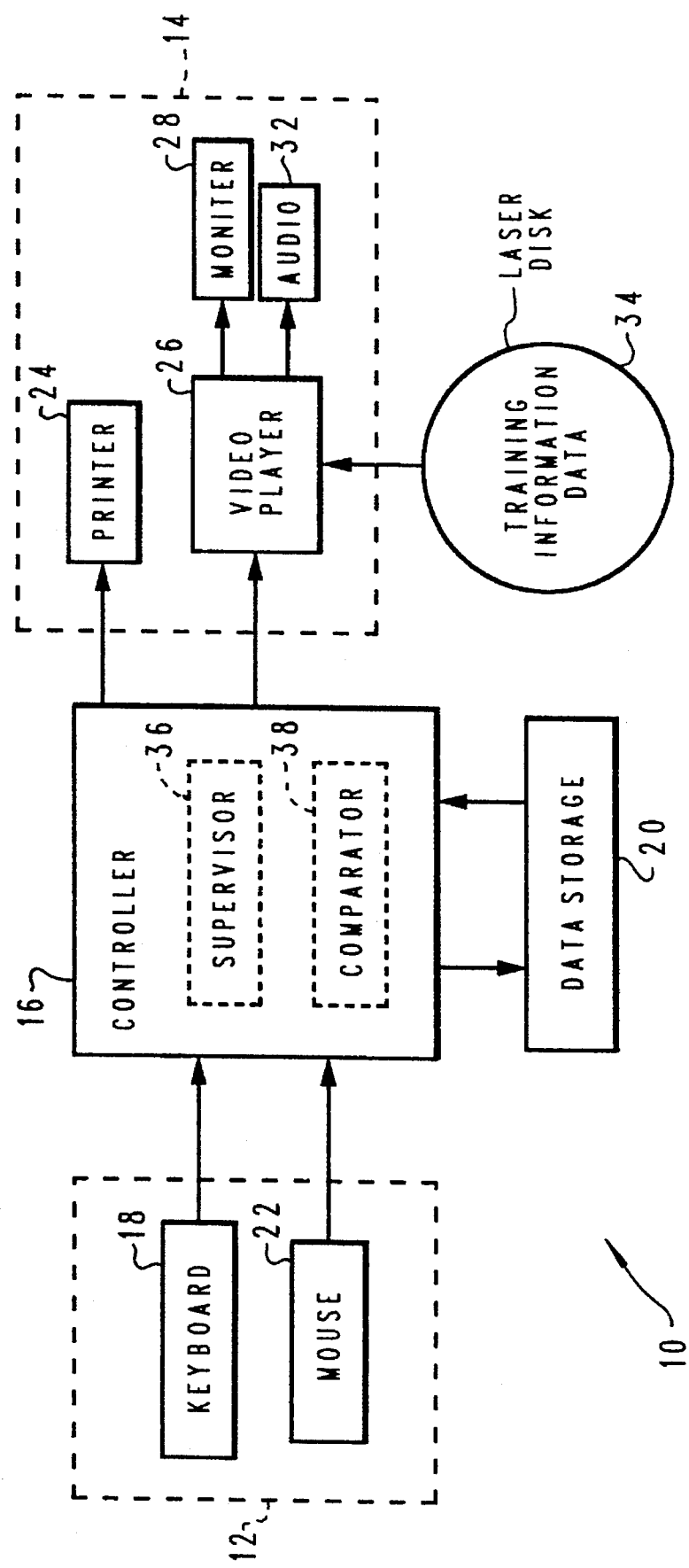
FIG. 1 is a schematic block diagram of a training and certification system of the present invention.

FIG. 1 is a schematic block diagram of a training and certification system 10 embodying the present invention. The system 10 includes input devices 12, output devices 14, a controller 16 and a data storage 20. The controller 16 is the focal point and has access to the output devices 14 and data storage 20. A user provides input data to system 10 through the input device 12, which may be a keyboard 18 or a mouse 22. This input data is received and interpreted by the controller 16.

The output devices 14 includes a printer 24 and a video player 26, such as a Pioneer LD-V 4400 Industrial Laser Disk Player. This video player 26 is connected to a monitor 28 which displays video pictures, and connected to audio speakers 32 to reproduce audio output. The video player 26 receives a laser disc 34 that contains training information data, such as video pictures, audio signals, text, menus, questions, etc.

In response to control signals from the controller 16, the video player 26 reads the training information data or selected elements thereof from disc 34 and generates signals so that the material can be displayed on the monitor 28 and have sound transmitted through audio speakers 32.

The controller 16 is a computer, such as a Commodore Personal Computer, that is loaded with programs such as supervisor 36 and comparator 38. Supervisor 36, interprets data fed in through input device 12 and determines the control data to be sent from the controller 16 to the output device 14 so that the correct output is generated on the monitor 28 and speakers 32. The supervisor 36 also determines information from the input device 12 that is to be sent to data storage 20, such as user identification and any test scores associated with the user.

Laser disc 34 has recorded on it software components that contain a plurality of video frames having pictures and/or text of the training information data. It also includes quizzes, answers and instructions.

On the controller 16, supervisor 36 includes a plurality of utility routines, a program sequence routine and a quiz routine. The utility routines include drivers for interfacing with the input device, the video player and the data storage. Some of these drivers may actually be provided from the operating system software, such as DOS, of the controller 16.

The program sequence routine contains a sequence of information relating to a training program. The training program may comprise the steps of displaying a series of images on the monitor, which is followed by the display of a test, which is then followed by a display of a series of questions of a quiz. The sequence of these operations would be listed in a table in the program sequence routine. In operation, this sequence is retrieved so that the different frames corresponding to the different steps are displayed successively onto the monitor.

The quiz routine controls the sequence of the quiz frames to be displayed on the monitor 28. During a quiz session, the controller 16 sends a command to the video player 26 to select a quiz frame for display on the monitor. A command is also sent to the video player 26 to freeze the display on the quiz frame. The quiz routine operates to monitor an answer from the user and also checks whether the answer given by the user is correct or not. Typically, the quizzes are multiple choice questions and call for answers with only a letter typed on the keyboard 18 or a click from a mouse 22.

Figure 2:
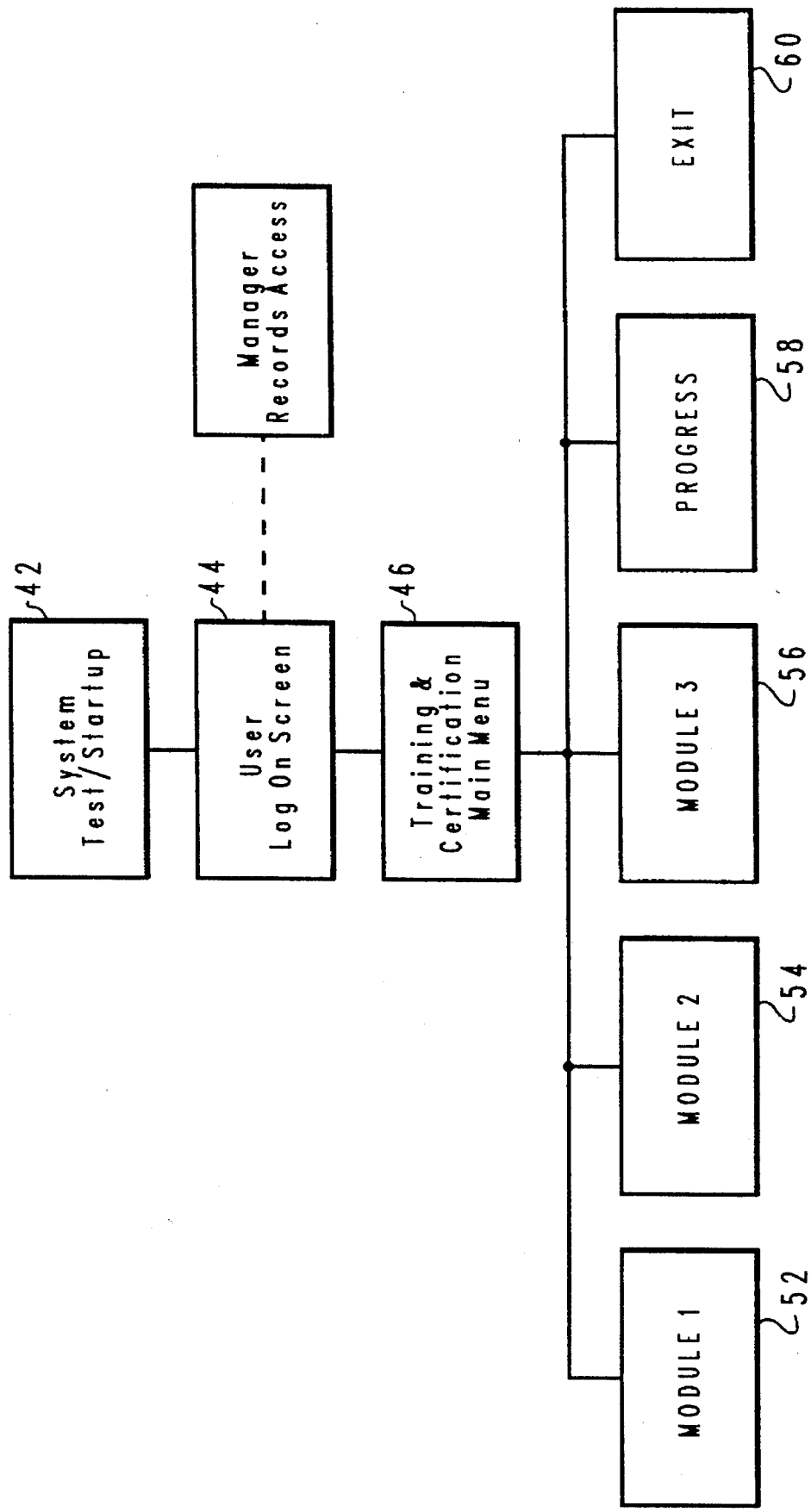
FIG. 2 is a schematic representation of global flow of data through the training and certification system of the present invention.
Figure 5:
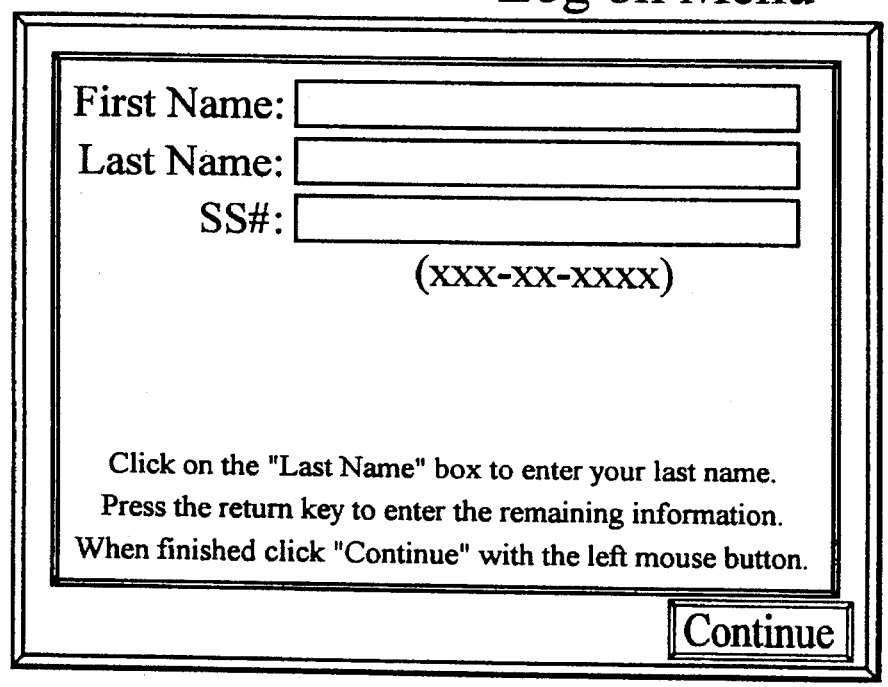
FIG. 5 is an exemplary screen of the main menu prompting for a user identification.

As shown in FIG. 2, the global flow through the training and certification system 10 starts with a system test/startup 42, after which a user logon screen 44 (see FIG. 5) appears for the user to enter his/her social security number. This information is then stored in the data storage 20, and any test scores for this particular user will be logged under that user's ID number. After logging on, the main menu 46 appears with a choice of various modules 52, 54, 56, which break up the training information into logical, easy to understand sections. The user also has the choice of checking his progress 58 or exiting 60 from the system 10.

Generally, each module provides a pre-test section that previews the user's knowledge of the objectives and instructions of the particular module. If he passes this pre-test, the user can go on to the next module; if not, the user views the second portion.

The second portion is an instruction section, which presents the content, provides information and mini-simulations. If the user is unable to complete or correctly progress to the mini-simulation, he is returned to the information presentation of the instruction section. If the user is correct, the user may proceed to the next instruction section of the module, but it is only after the user has achieved a certain level of knowledge that the user may be able to go on to the next instruction section.

There is provided a full module simulation which applies everything the user has learned from the instruction sections. If the user has failed in the simulation, the module points out the errors and reviews it with the user. If the user passes the simulation, he goes on to the post-test. At the post-test, he can either pass or fail. If he fails, he is requested to take the module instruction sections again. The scores from the post-test are logged in the data storage 20, and a comparator 38 will review the scores and determine if the scorer has achieved a preset level of competence to allow certification with respect to that task.

Figure 3:
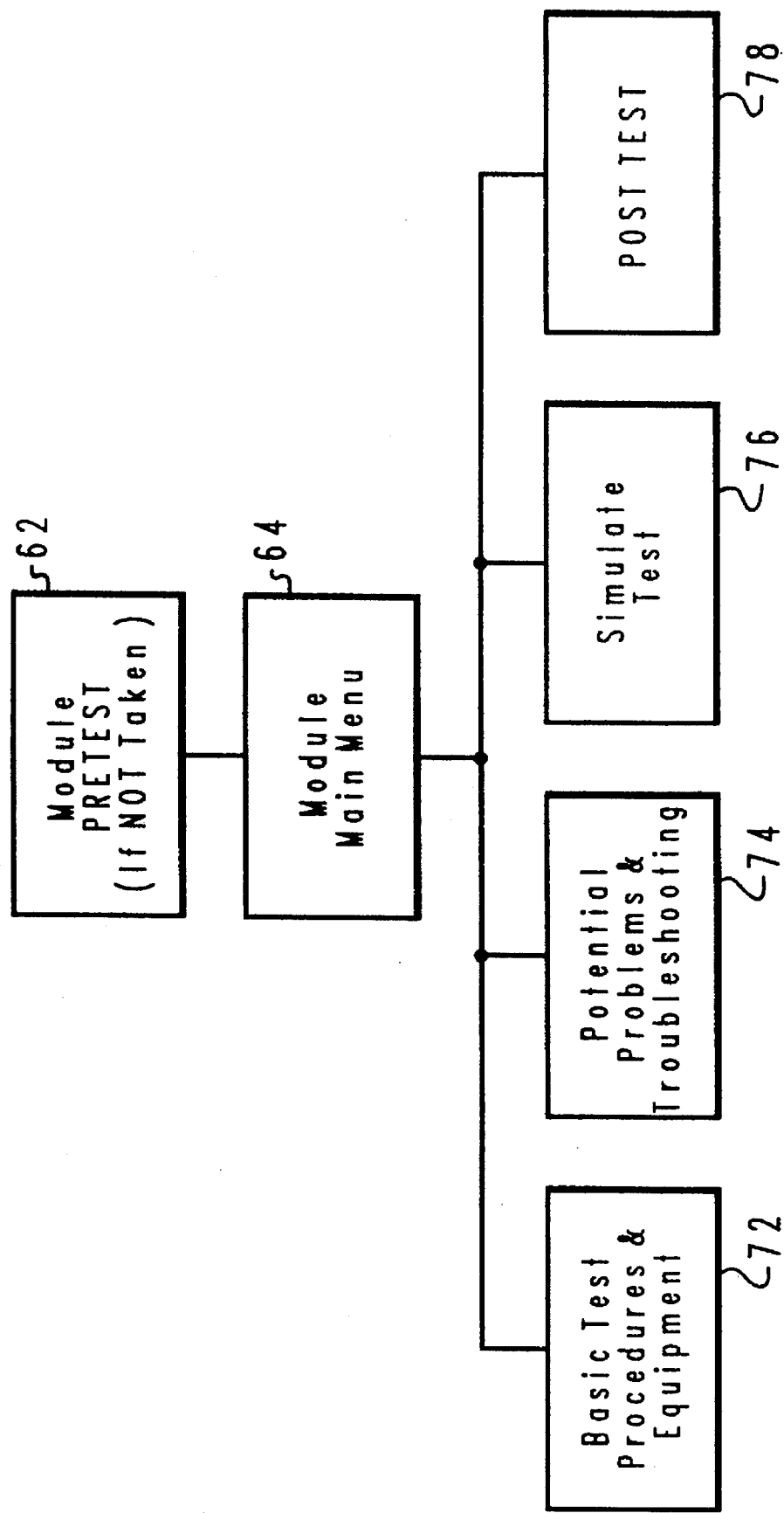
FIG. 3 is a schematic representation of the module flow of data through the training and certification system of the present invention.

As shown in FIG. 3, when module 52, 54, 56 is initially selected (see FIG. 3), a pre-test 62 is given to the user. Subsequent selection of the same module bypasses the pre-test 62 if the user has already taken the pre-test. After answering the questions and having the score recorded to the data storage 20, a module main menu 64 appears. Here, the user has the ability to choose from instruction sections (basic test procedures and equipment 72, potential problems and troubleshooting 74), simulation tests 76 and the post test 78. This module menu 64 allows the user flexibility to be able to review certain sections, leave the training and return and complete the remaining sections, or complete all sections and return to complete the post-test 78.

Figure 4A:
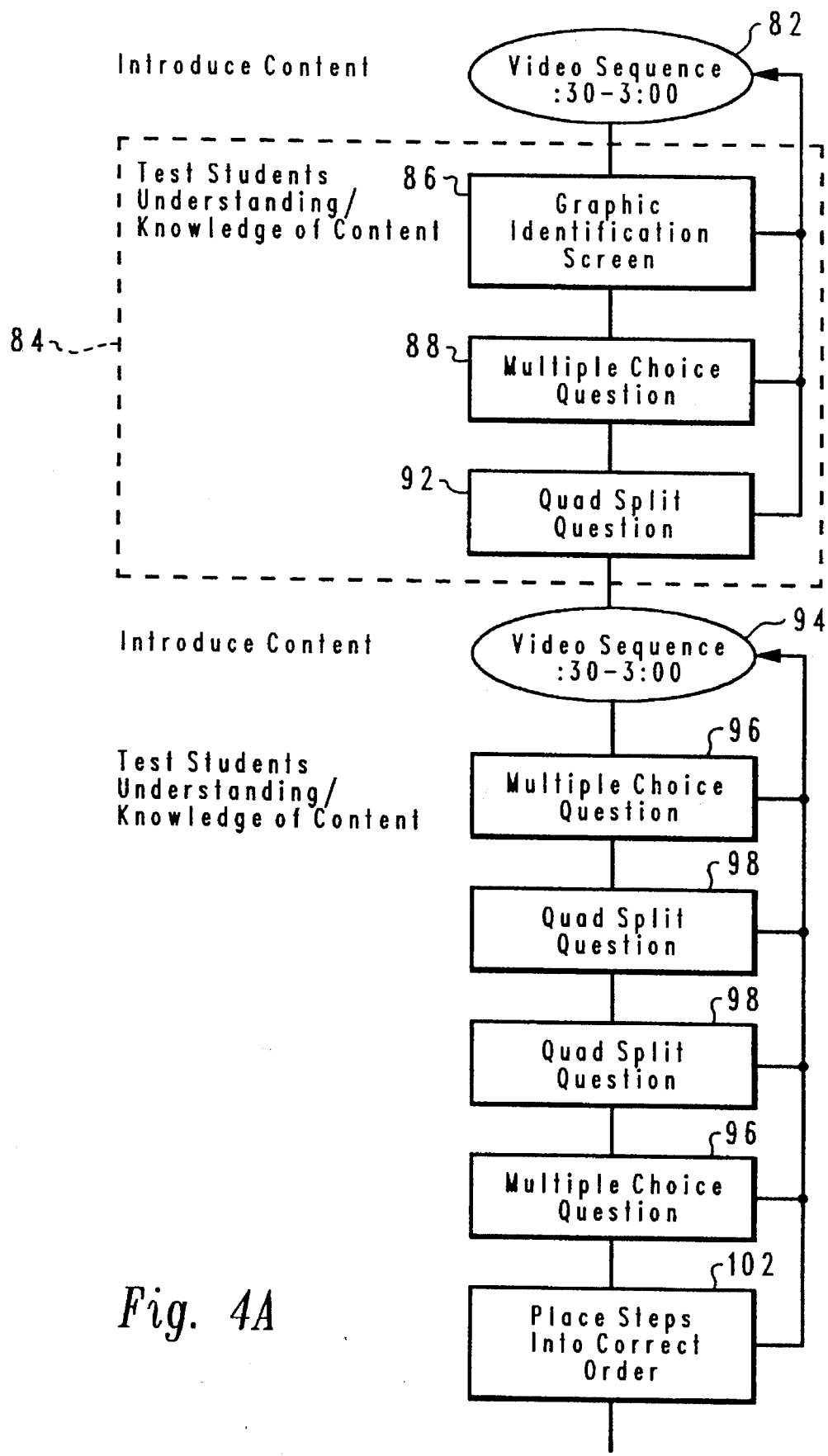
FIGS. 4A and 4B are schematic representations of section flow of data through the training and certification system of the present invention.
Figure 4B:
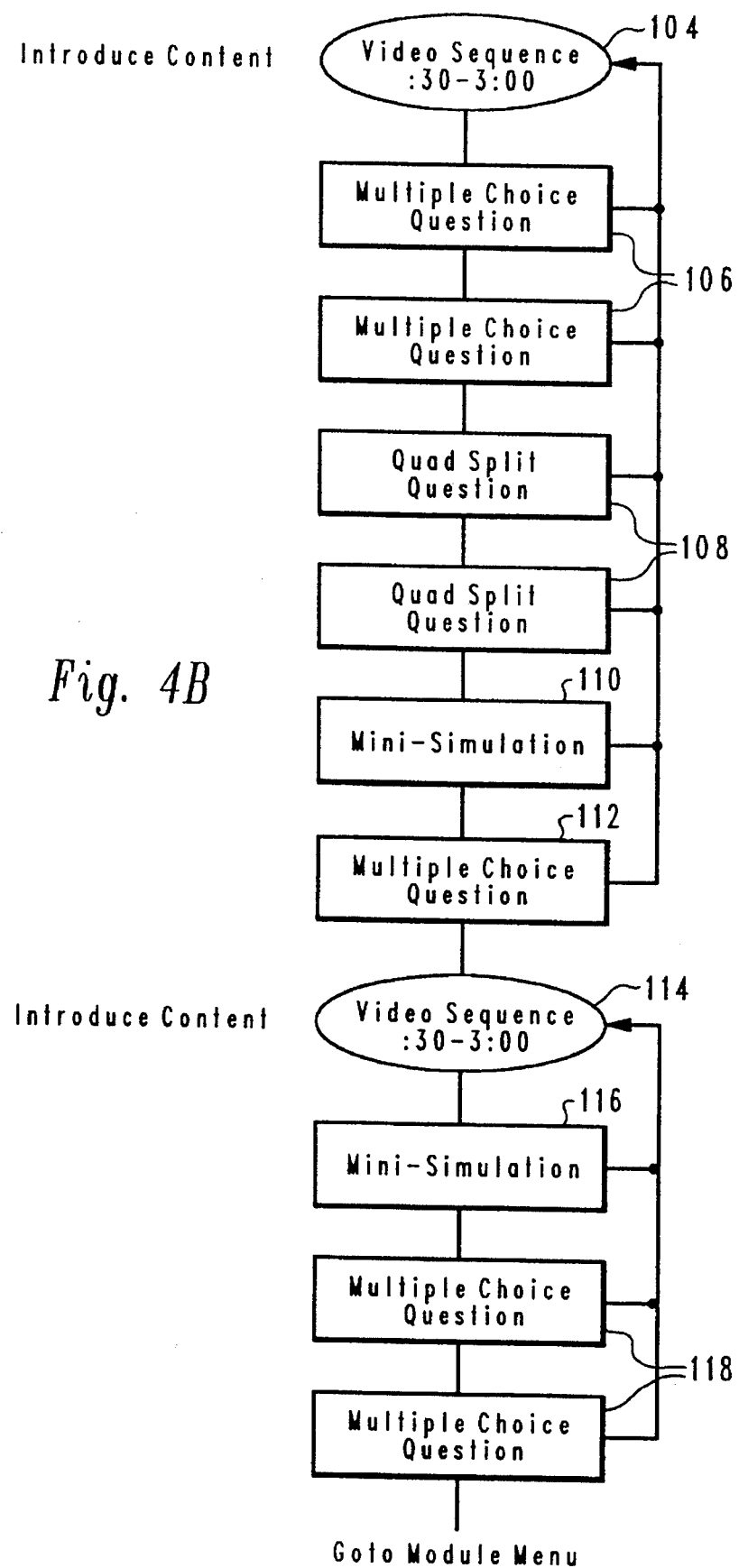

FIGS. 4A and 4B detail the flow through instruction sections 72, 74. When section 72, 74 has been selected from the module main menu 64, the training and certification system 10 provides an introduction 82 to the section. The trainee is then tested for understanding and knowledge of the content 84.

Figure 6:
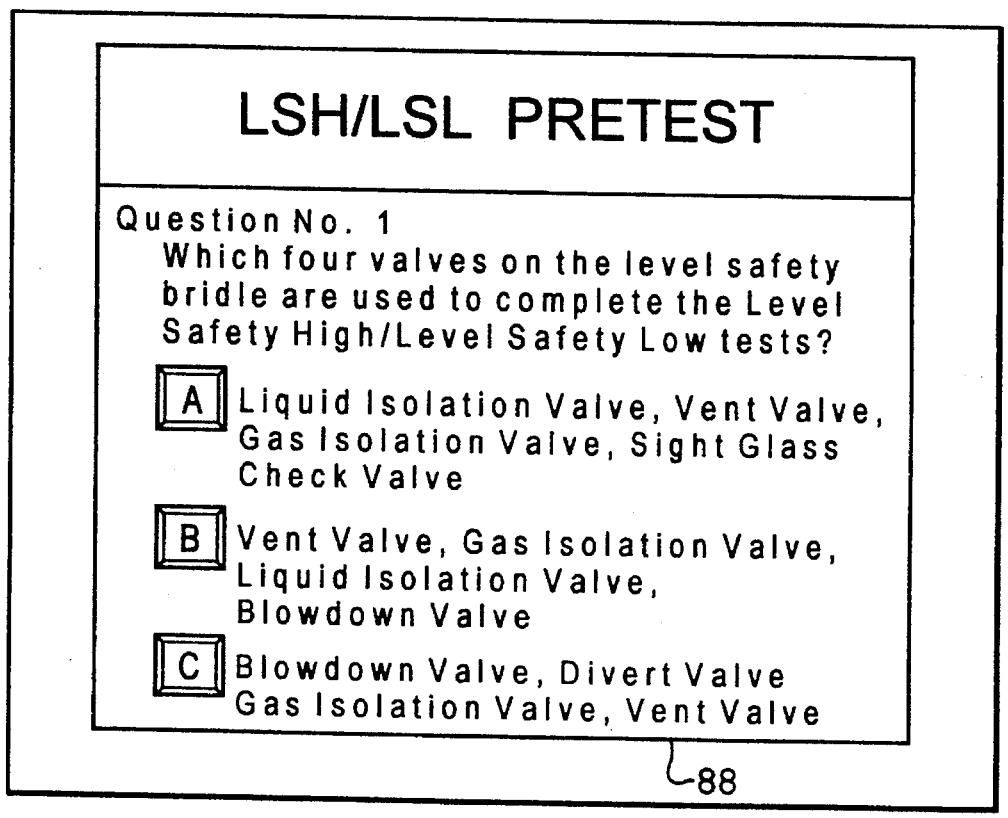
FIG. 6 is an exemplary screen of a sample question.
Figure 7:
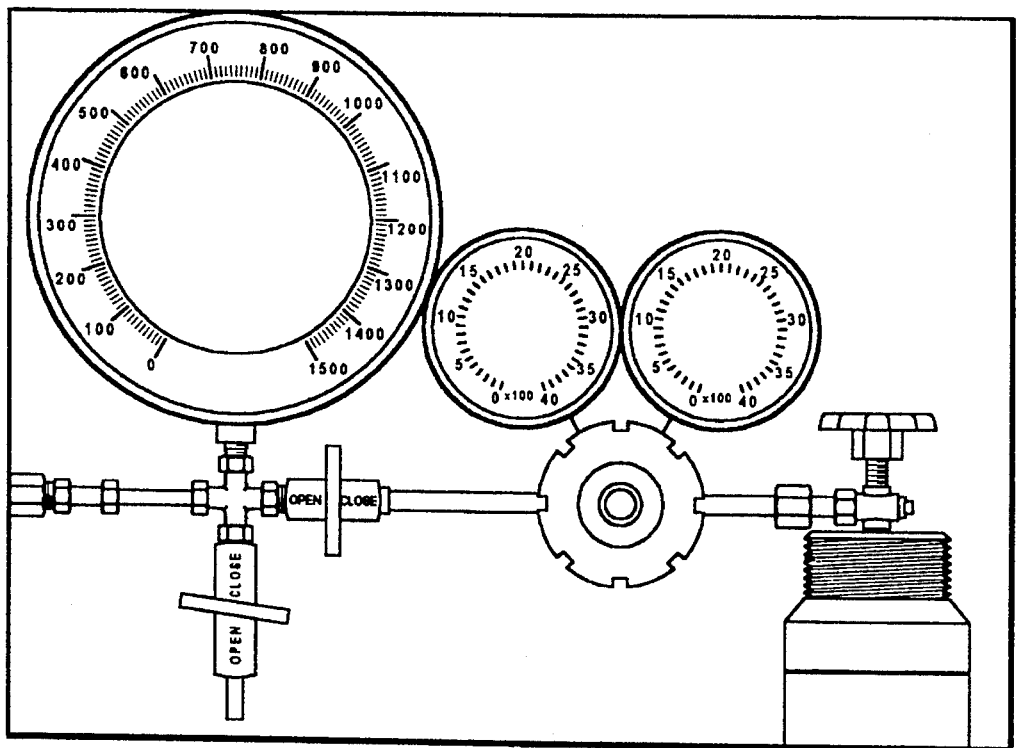
FIG. 7 is an exemplary screen provided to a user for interaction with the training and certification system.
Figure 8:
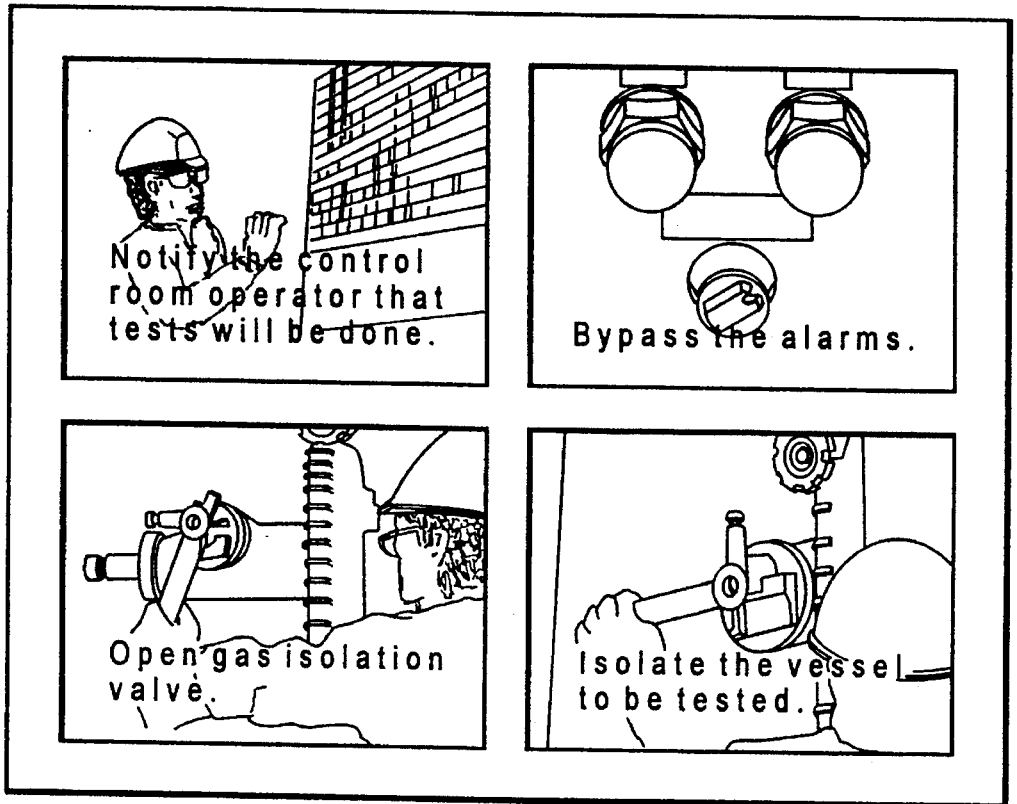
FIG. 8 is an exemplary screen of a quad split question.

After viewing the content, the trainee is asked to identify certain graphic portions of the content 84, which is presented in a graphic identification screen 86 as shown in FIG. 7. If the trainee passes the graphic identification screen 86, the student is then asked several multiple-choice questions 88 (see FIG. 6) pertaining to the content. If the user successfully passes the multiple-choice question, he is then asked an additional question which is displayed in the form of a quad-split question 92. (See FIG. 8.) A wrong answer to any of the above questions loops the user into the video portion of the content 84.

Being able to correctly answer all the questions for a particular subject, the user is then introduced to more advanced content 94 and user is again queried with multiple-choice questions 96, quad-split questions 98 and is asked to place certain steps in correct order 102. If at any of these stations the user is wrong, the user is looped back to the video on advanced content 94.

After completing that portion, the user is shown another video content 104 that combines and enhances the preceding content 82, 94 and asked more detailed multiple-choice questions 106 or provided more detailed quad-split questions 108. During this video content 104, the user is introduced to a mini-simulation 110, generally being introduced to the equipment or control board that is actually set up at the site. Here, the user is provided a problem and must "work" the board or safety equipment as if under actual conditions. The mini-simulation 110 provides realistic sights and sound, as well as the adverse consequences of incorrect actions. A mistake on the mini-simulation will return user to the video content 104 to refresh the user's knowledge. Then, user is returned to the mini-simulation to provide the correct actions necessary. To reinforce the user's action in the mini-simulation 110, another series of multiple-choice questions 112 is presented.

The section 72, 74 also has another video content 114 that is followed by a mini-simulation 110, which is presented to the user for interaction to be followed by multiple-choice questions 118. Having completed this instruction section 72, 74, the user can advance to the next section or if he has knowledge of those sections go directly to the post-test 78.

The post-test 78 tests the knowledge of the user with respect to the entire module. After completing the test, the scores are then stored in data storage 20 under his user identification number. The training and certification system 10 is flexible enough to allow the user to cease the training session at any point and allow him to return to that section or module at his convenience. The system 10 keeps track of the user's progress and scores. If the trainee has completed all portions of the training and certification system 10. His scores are then compared to a proficiency level set by a governmental agency or internally by the corporation to determine if that user can be certified as being able to perform that particular task.

It is to be understood that the terminology as employed in the description and claims incorporated herein is used by way of description and not by way of limitation to facilitate understanding of the structure, function and operation of the combination of elements which constitute the present invention.

Moreover, while the foregoing description and drawings illustrate in detail working embodiments of the invention to those skilled in the art to which the present invention relates, the present disclosure will suggest many modifications in construction as well as widely differing embodiments and applications without thereby departing from the spirit and scope of the invention. The present invention, therefore, is intended to be limited only by the scope of the appended claims and the applicable prior art.

What is claimed is:

1. A computer-implemented system for training and certifying a trainee to perform a task, the system comprising:

a data storage for storing preset limit data to determine certifiability of the trainee and for storing log data of the trainee;

a controller for receiving input data of the trainee from an input device, sending control data to an output device and sending said log data of the trainee to said data storage;

a supervisor for interpreting said input data, determining said control data to be sent by said controller to said output device and determining said input data to be stored as said log data in said data storage, said supervisor further monitoring trainee's interaction with simulations of a portion of said task to determine control data sent to said output device to review instructions and information pertaining to said portion of said task if it is determined that said trainee's interaction with simulations of said portion of said task is not acceptable or to provide a test pertaining to said portion of said task if it is determined that said trainee's interaction with simulations of said portion of said task is acceptable, such that said interaction with said simulations and said review or test pertaining to said portion of said task is thereafter repeated for other portions of said task, and is followed by a post testing of the trainee's overall knowledge of said task for comprising said log data; and a comparator that is accessible to said data storage to compare said log data with said preset limit data to determine certifiability of the trainee.

2. The system as set forth in claim 1 wherein said supervisor includes several software modules.

3. A computer method for training and certifying a trainee to perform a task, the method comprising the computer implemented steps of:

a. receiving input data from a trainee using a computer-controlled input device;

b. providing to the trainee, through a computer-controlled output device, instructions and information to do a portion of the task;

c. providing to the trainee, through said computer controlled output device, simulations of said portion of said task;

d. monitoring trainee's interaction with said simulations of said portion of said task to determine control data sent to said output device to review instructions and information if said trainee's interaction with simulations of said portion of said task is not acceptable or provide a test related to said portion of said task if said trainee's interaction with simulations of said portion of said task is acceptable;

e. testing the trainee's knowledge of said portion of said task using said output device and said input device;

f. responsive to said testing or simulations, providing on said output device additional information and instructions to the trainee;

g. repeating steps c. through e for the same portion of said task if said trainee's knowledge of said portion of said task is not acceptable or other portions of said task if said trainee's knowledge of said portion of said task is acceptable;

h. post-testing the trainee's overall knowledge of all information and instructions for said task provided to trainee using said output device and said input device; and i. comparing, in said computer, trainee's post-test scores with a proficiency level to determine certifiability.

4. A computer method for training and certifying a trainee to perform a task, the method comprising the computer implemented steps of:

a. identifying trainee;

b. pretesting knowledge of the trainee;

c. storing trainee identification and score of pretest in a data storage;

d. instructing trainee to a portion of necessary information to perform a task;

e. providing on said output device a simulation of a portion of the task to be performed for trainee to interact with;

f. monitoring trainee interaction with said simulation to determine need for review;

g. testing trainee knowledge of information necessary to proceed to next portion of said necessary information;

h. repeating steps c. through f. for remaining portions of necessary information;

i. testing trainee knowledge of all portions of said necessary information to perform task; and j. comparing trainee test result with an acceptable standard to determine certifiability of trainee.

* * * * *